(12) United States Patent
Bouldin et al.

(10) Patent No.: US 8,684,171 B1
(45) Date of Patent: Apr. 1, 2014

(54) MODULAR CONVEYOR

(75) Inventors: Anderson K. Bouldin, McMinnville, TN (US); Paul M. Whiting, Murfreesboro, TN (US); Mark D. Long, Beersheba Springs, TN (US)

(73) Assignee: Bouldin Corporation, McMinnville, TN (US)

( * ) Notice: Subject to any disclaimer, the term of this patent is extended or adjusted under 35 U.S.C. 154(b) by 139 days.

(21) Appl. No.: 13/545,141

(22) Filed: Jul. 10, 2012

(51) Int. Cl.
   B65G 21/00 (2006.01)
   B65G 21/06 (2006.01)
   B65G 21/02 (2006.01)

(52) U.S. Cl.
   CPC ............... *B65G 21/06* (2013.01); *B65G 21/02* (2013.01); *B65G 2207/30* (2013.01)
   USPC ..................................... 198/860.2; 198/861.1

(58) Field of Classification Search
   CPC ........ B65G 21/02; B65G 21/06; B65G 21/10; B65G 2207/30; B65G 19/287; B65G 21/14
   USPC .................. 198/860.2, 861.1, 735.2
   See application file for complete search history.

(56) References Cited

U.S. PATENT DOCUMENTS

| 2,627,960 | A | | 2/1953 | Eberle |
| 4,172,677 | A | * | 10/1979 | Gunti ......................... 198/860.2 |
| 4,508,209 | A | | 4/1985 | Whitman |
| 5,421,451 | A | * | 6/1995 | Easton ....................... 198/860.1 |
| 5,456,348 | A | | 10/1995 | Whetsel et al. |
| 6,427,831 | B1 | * | 8/2002 | Norton .......................... 198/841 |
| 7,681,710 | B2 | | 3/2010 | Kuhn et al. |
| 7,891,483 | B2 | * | 2/2011 | Kamm ........................... 198/841 |
| 8,011,498 | B2 | * | 9/2011 | Trivette ..................... 198/860.2 |
| 8,066,110 | B2 | * | 11/2011 | Antoline et al. ............. 198/583 |
| 8,408,385 | B2 | * | 4/2013 | Swinderman .............. 198/860.1 |
| 2008/0073185 | A1 | * | 3/2008 | Brayman et al. ........... 198/860.2 |

OTHER PUBLICATIONS

Exhibit A: Bouldin & Lawson brochure entitled "Standard Conveyor/Portable Conveyor", 1 page (undated but admitted to be prior art).
Exhibit B: Bouldin & Lawson brochure entitled "Pro-Line Modular Conveyor", 1 page (undated but admitted to be prior art).
Exhibit C: Bouldin & Lawson brochure entitled "WEBVAB Conveyor Systems", 1 page (undated but admitted to be prior art).
Exhibit D: Wevab website printout entitled "Excellent", 6 pages (undated but admitted to be prior art).

* cited by examiner

*Primary Examiner* — James R Bidwell
(74) *Attorney, Agent, or Firm* — Waddey & Patterson, P.C.; Lucian Wayne Beavers

(57) ABSTRACT

A modular conveyor apparatus includes a plurality of substantially identical conveyor segments. Each conveyor segment has a pair of laterally spaced protrusions or hooks extending from one end thereof. Each conveyor segment has a plurality of spaced openings or slots along at least one of its side walls, so that two like conveyor segments can be connected together perpendicularly with the hooks of a first segment received in the side wall slots of a second segment. Thus the perpendicular connection between two conveyor segments may be made at any selected one of a plurality of locations along the length of each conveyor. Provision may also be made for end to end connection of the conveyor segments.

20 Claims, 8 Drawing Sheets

MODULAR CONVEYOR

BACKGROUND OF THE INVENTION

1. Field of the Invention

The present invention relates generally to conveyor apparatus, and more particularly, but not by way of limitation, to modular conveyor apparatus designed for use in horticulture.

2. Description of the Prior Art

Conveyor systems for use in horticulture such as in a large green-house, often include a long length of main conveyor with laterally extending lateral conveyor segments connected perpendicularly to the main conveyor.

There is a need for improvements in such systems which allow such systems to be manufactured and constructed in an economical manner.

SUMMARY OF THE INVENTION

In one aspect a modular conveyor apparatus is provided which includes a conveyor bed assembly including first and second ends and first and second longitudinal sides. A drive roller is attached to the first end of the conveyor bed assembly. An idler roller is attached to the second end of the conveyor bed assembly. An endless conveyor belt extends around the conveyor bed assembly and the drive roller and the idler roller. At least one of the first and second ends of the conveyor bed assembly includes a pair of laterally spaced hooks spaced apart by a hook spacing distance. At least one of the longitudinal sides of the conveyor bed assembly includes a plurality of slots defined therein. The slots are complementary to the hooks for receiving the hooks of another like conveyor in the slots, so that the conveyor can be connected perpendicularly to the other like conveyor at a selected one of a plurality of locations along a length of the conveyor.

In another aspect, a modular conveyor apparatus includes a conveyor bed assembly including a pair of laterally spaced protrusions at one end of the conveyor bed assembly. The conveyor bed assembly includes a longitudinal side having a plurality of equally spaced openings defined therein. The openings are complementary to the protrusions so that the protrusions can be received in the openings of another like conveyor apparatus. The protrusions are spaced apart by a protrusion spacing. The openings are spaced apart by an opening spacing. The protrusion spacing is a whole multiple of the opening spacing.

In yet another aspect, a modular conveyor apparatus includes first and second conveyor segments. Each conveyor segment is of substantially identical construction. Each conveyor segments includes a conveyor bed having first and second ends, and having a longitudinal side wall. A drive roller is connected to the first end of the conveyor bed. An idler roller is connected to the second end of the conveyor bed. A drive motor is provided for driving the drive roller. A conveyor belt extends around the drive roller and the idler roller. A pair of laterally spaced protrusions extend from the second end of the conveyor bed. The longitudinal side wall of the conveyor bed has a plurality of openings defined therein complementary in shape to the protrusions. The first and second conveyor segments are connected together perpendicularly with the laterally spaced protrusions of the first conveyor segment received in two of the openings in the longitudinal side wall of the second conveyor segment.

Numerous objects, features and advantages of the present invention will be readily apparent to those skilled in the art upon a reading of the following disclosure when taken in conjunction with the accompanying drawings.

DETAILED DESCRIPTION

Figure 1:
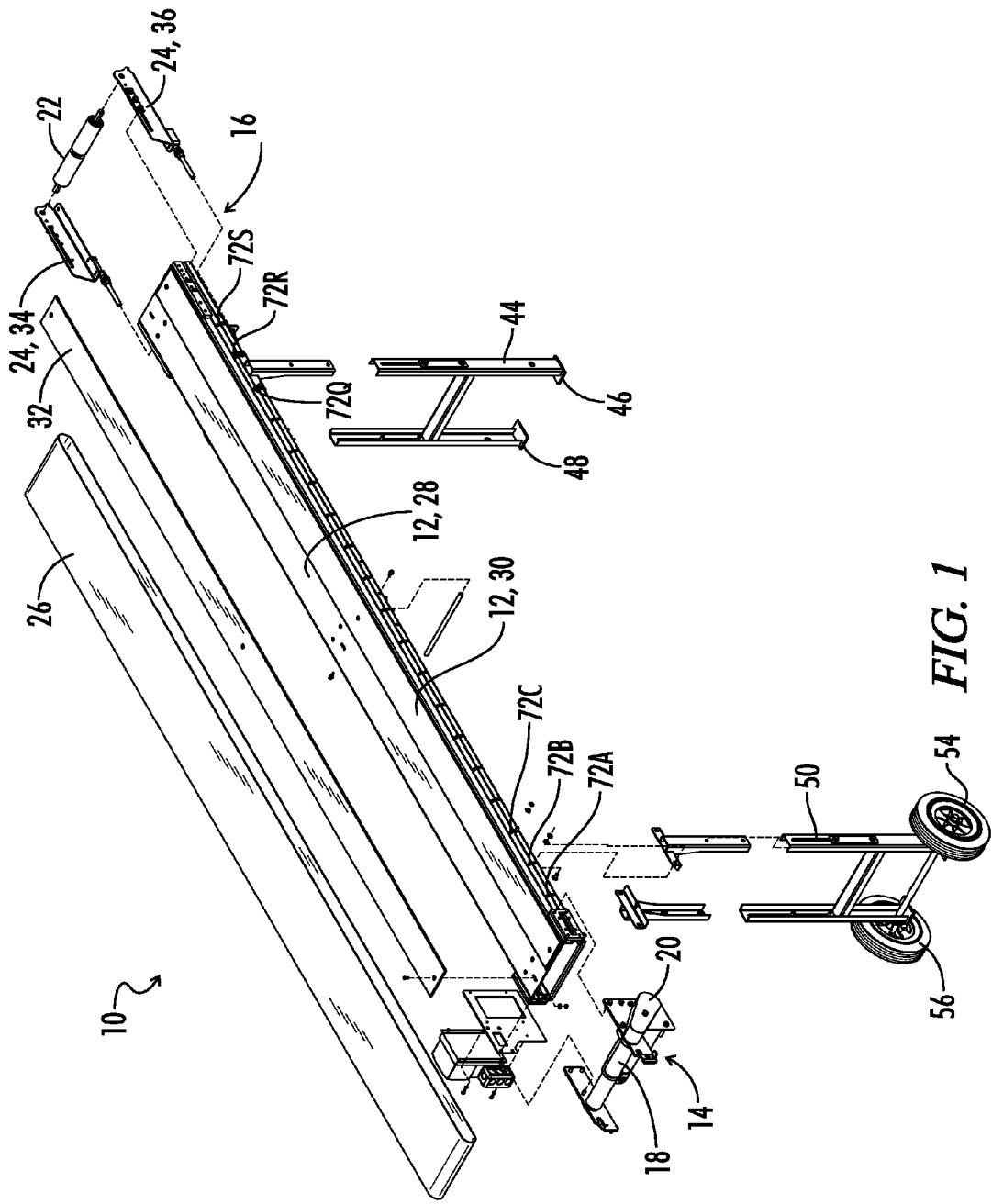
FIG. 1 is an exploded perspective view of a modular conveyor apparatus.

FIG. 1 shows an exploded perspective view of a modular conveyor apparatus 10. The apparatus 10 includes a conveyor bed assembly 12 having a drive end or first end 14 and a take-up end or second end 16. A drive roller 18 is connected to the first end 14 and is powered by a drive motor 20. An idler roller or take-up roller 22 is connected to the second end 16 and is adjustably positioned by a take-up assembly 24. An endless conveyor belt 26 extends around the conveyor bed assembly 12 and the drive roller 18 and idler roller 22.

Figure 6:
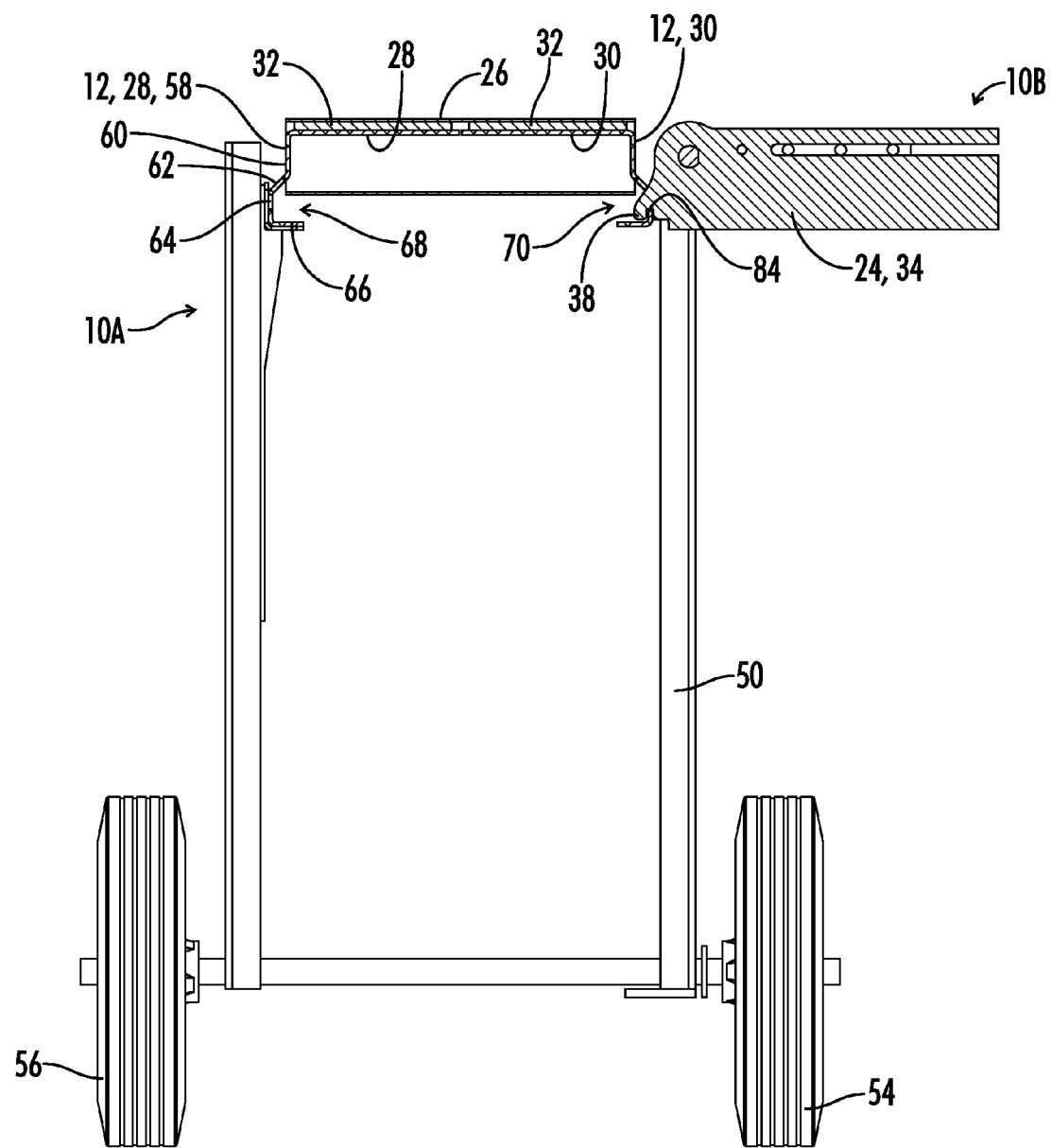
FIG. 6 is an elevation section view taken along line 6-6 of FIG. 3 showing the cross-sectional shape of the conveyor bed assembly of one conveyor and showing the manner in which the hooks of another conveyor are received in the openings of the conveyor bed assembly of the first conveyor.

The conveyor bed assembly 12 is made up of first and second conveyor bed halves 28 and 30 best seen in FIG. 6. The halves 28 and 30 are connected together by lateral connector pieces (not shown). A sheet of ultra high molecular weight plastic 32 overlies each of the halves of the conveyor bed assembly 12. The sheets 32 provide a low friction surface over which the upper span of the conveyor belt 26 may slide.

The take-up assembly 24 includes first and second side plates 34 and 36 which are connected to the conveyor bed assembly 12 in a longitudinally adjustable manner so that the longitudinal distance between drive roller 18 and idler roller 22 can be adjusted to adjust the slack or tension in the conveyor belt 26.

Figure 2:
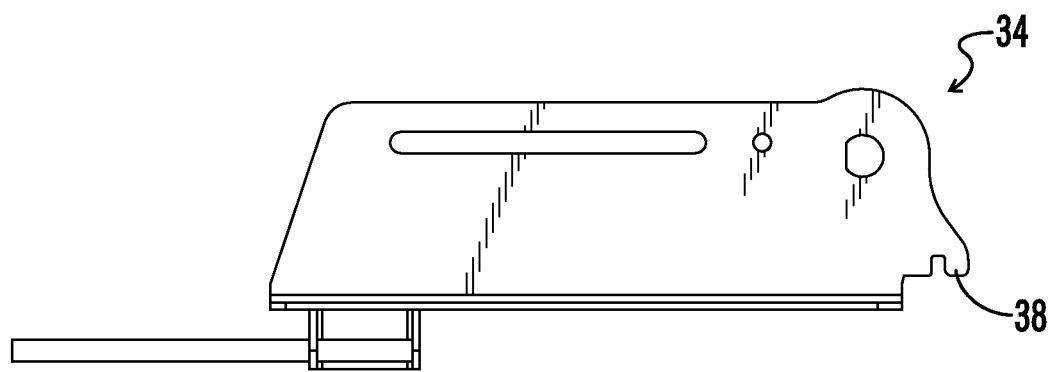
FIG. 2 is an enlarged side elevation view of one side plate of a take-up assembly showing one of the hooks or protrusions of the conveyor.
Figure 4:
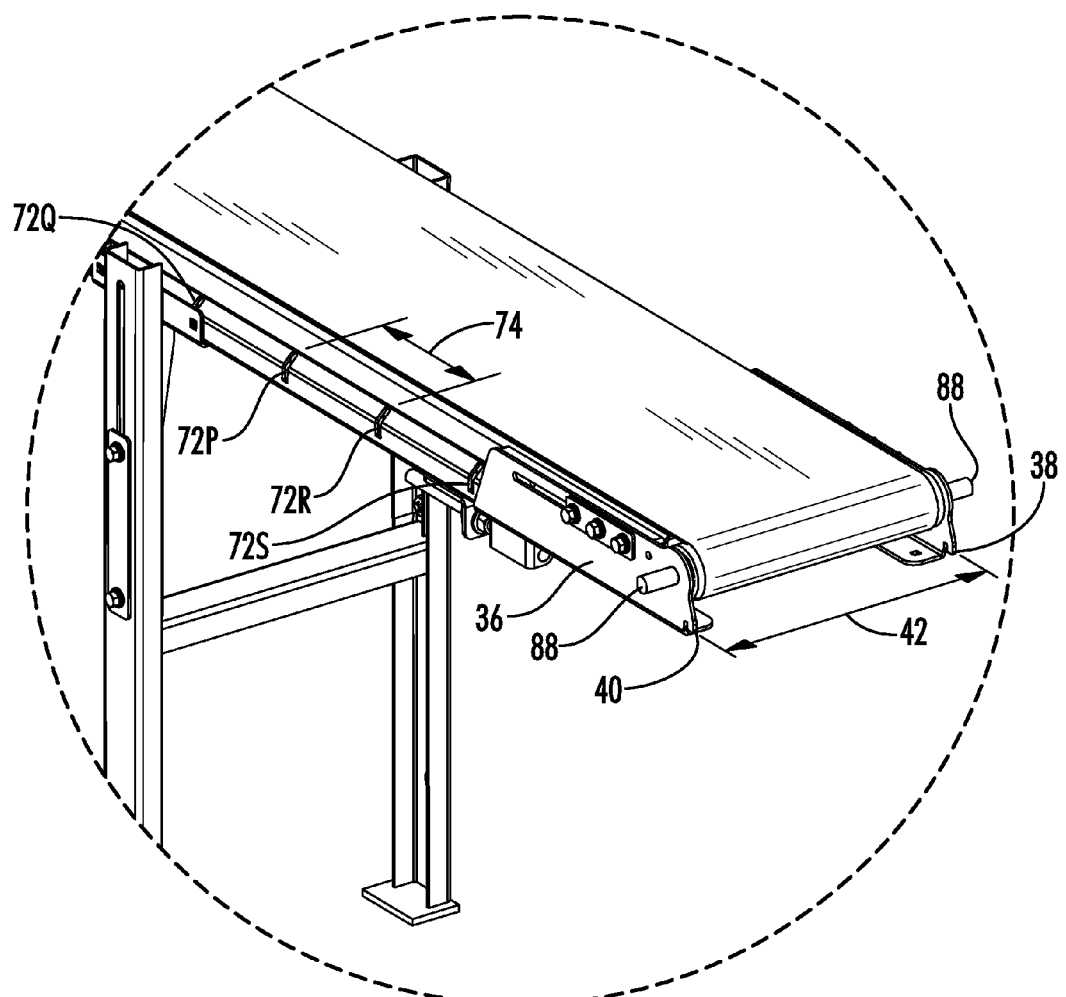
FIG. 4 is an enlarged perspective view of the take-up end of the right hand conveyor of FIG. 3.
Figure 5:
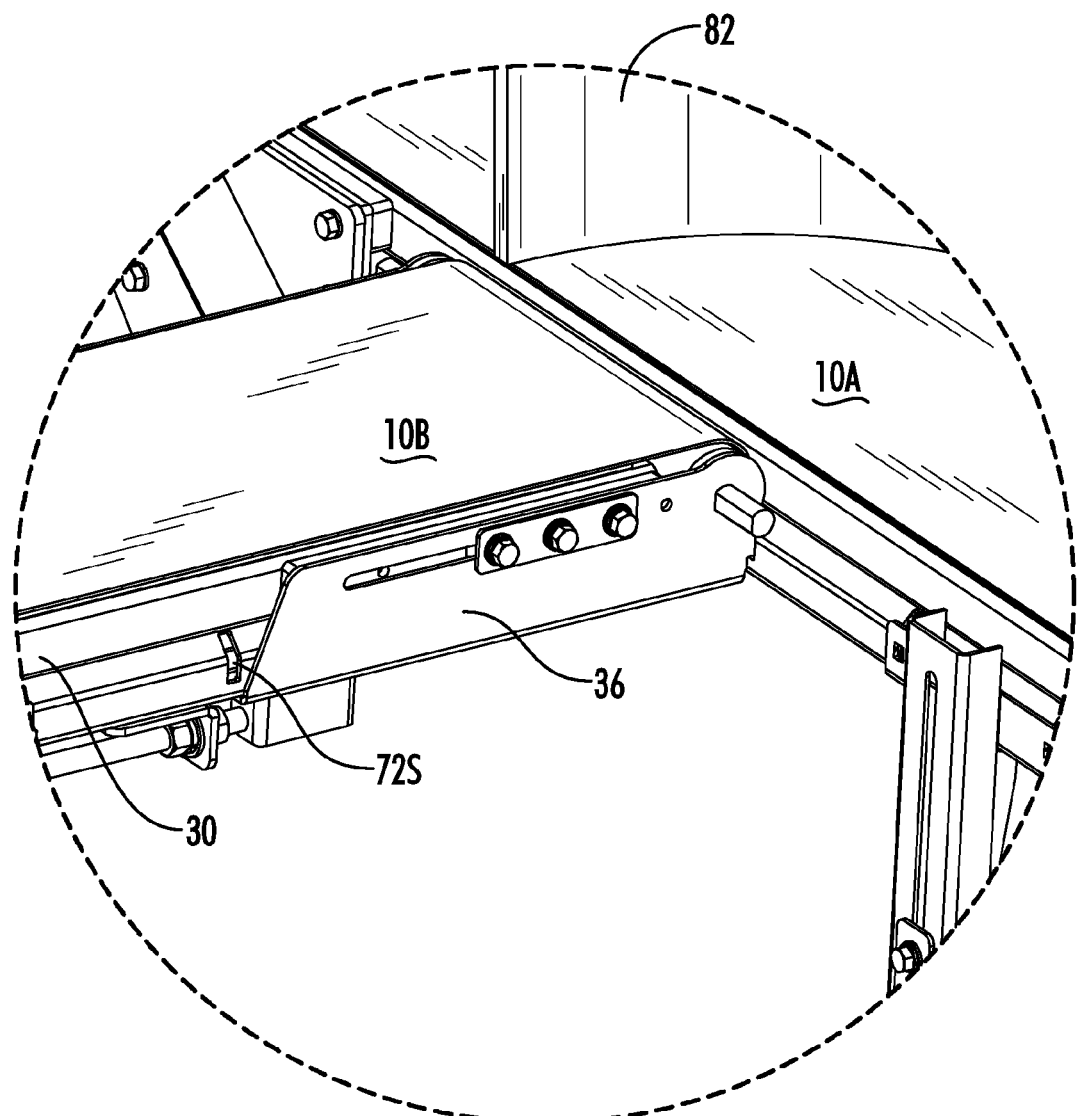
FIG. 5 is an enlarged perspective view of the connection between the conveyors in FIG. 3.

An enlarged side elevation view of the side plate 34 is seen in FIG. 2. The side plate 34 has a first hook or longitudinally extending protrusion 38 defined thereon. As seen in FIG. 4 there is a second such hook 40 defined on the second side plate 36 and the hooks 38 and 40 are laterally spaced apart by a hook spacing or protrusion spacing 42.

The conveyor bed assembly 12 is supported near the take-up end or second end 16 by a take-up end leg assembly 44 which has lower feet 46 and 48 which engage the ground surface without rollers.

Near the other end 14 of the conveyor bed assembly 12 is a drive end leg assembly 50 having wheels 54 and 56 for engaging the ground surface. This allows the conveyor apparatus 10 to be easily moved around on the shop floor by lifting the take-up end 16 and rolling the conveyor apparatus 10 on the wheels 54 and 56 to a desired location.

Each of the conveyor bed assembly halves 28 and 32 may be formed from bent sheet metal and has a cross-sectional shape as best shown in FIG. 6. The left hand conveyor half 28, for example, defines a longitudinal side 58 of the conveyor bed assembly 12 extending the length of the conveyor bed assembly 12 and having a cross-sectional shape defined by an upper vertical wall 60, a tapered intermediate wall 62, a lower vertical wall 64, and a bottom laterally inwardly extending flange 66.

The tapered intermediate wall 62, the lower vertical wall 64, and the laterally inwardly extending flange 66 can be described as defining a laterally outwardly protruding laterally inwardly open channel 68.

The right hand half 30 of conveyor bed assembly 12 is shaped in a mirror image of that just described for the left hand half 28. The right hand half 30 similarly defines a laterally outwardly protruding laterally inwardly open channel 70 in its lower portion.

Each of the longitudinal sides of the conveyor bed assembly 12 has a plurality of equally spaced slots or openings 72A, 72B, 72C, etc., defined therein. In the embodiment illustrated in FIG. 1 there are nineteen such slots 72A-72S.

As best seen in FIG. 4, the slots 72 are equally spaced along the length of the conveyor, by a slot spacing 74.

Figure 3:
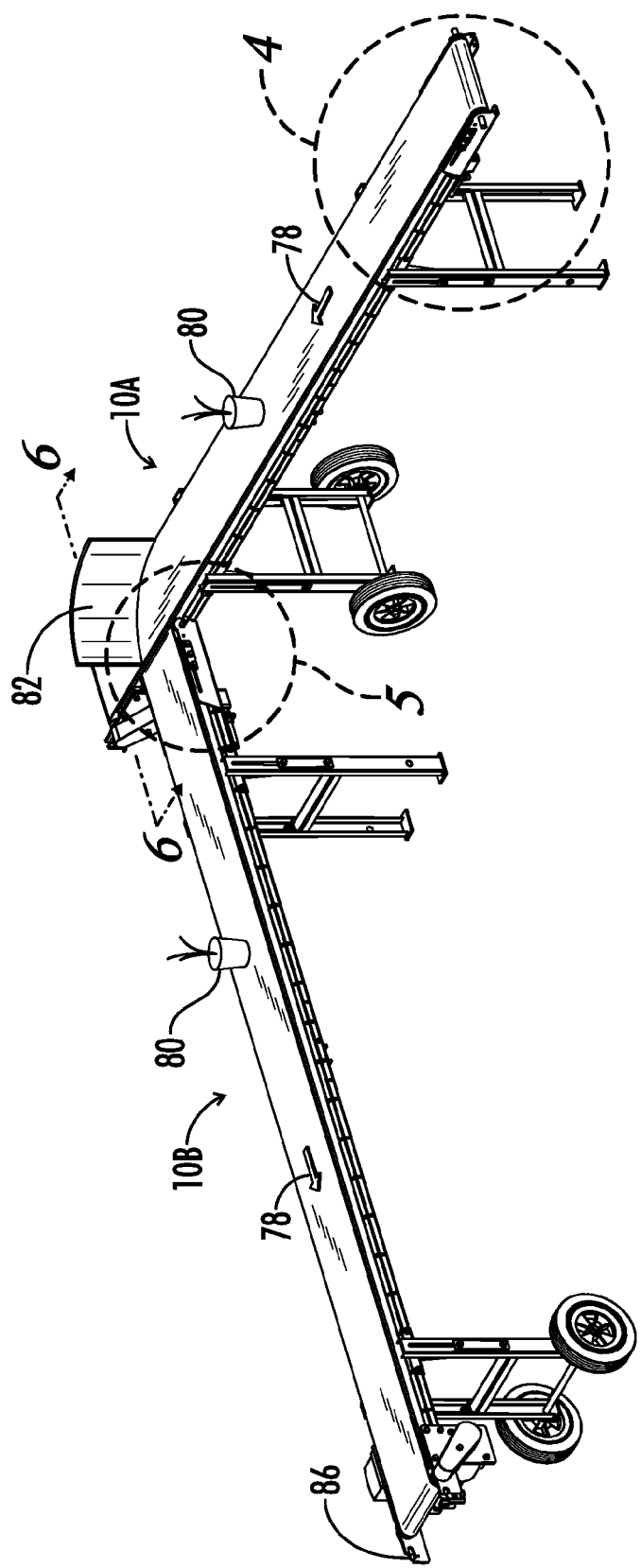
FIG. 3 is a perspective view showing two of the conveyors of FIG. 1 connected together perpendicularly.

The hook spacing 42 is preferably a whole multiple of the slot spacing 74. In the embodiment illustrated in FIG. 4, the hook spacing 42 is twice the slot spacing 74. For example, the hook spacing 42 may be 12 inches and the slot spacing 74 may be six inches. The hook spacing 72 could also be equal to the slot spacing 74 or could be three times or four times the slot spacing 74 as desired. It will be appreciated that when two of the conveyors are connected together perpendicularly as shown in FIG. 3, the user will have the option of making that connection at any one of a plurality of selectable locations along the length of the first conveyor 10A, which selectable locations are spaced apart by six inches, i.e. by the slot spacing 74. Because the hook spacing 42 is equal to or greater than the slot spacing, these selectable locations may be described as being separated by no more than the hook spacing.

Preferably both of the side walls of the conveyor bed assembly 12 have such slots so that the second conveyor 10B can be connected to either side of the first conveyor 10A.

As shown in FIG. 3, the conveyor belts of each of the conveyor segments 10A and 10B move in the conveying direction 78 which is from the take-up end 16 toward the drive end 14.

Thus, with the two conveyors connected at right angles as shown in FIG. 3, articles such as potted plants 80 can move along the first conveyor segment 10A and then be turned by a guide piece 82 onto the second conveyor 10B to then move in a direction perpendicular to that which the plants were moving on the conveyor 10A.

As best seen in FIG. 6, the hooks 38 and 40 are configured to rest on lower edges such as 84 of the slots 72, which lower edges are defined in the lower vertical wall 64.

As also seen in FIG. 6, the conveyor segments 10A and 10B are connected together with the conveyors oriented substantially horizontally and at substantially equal elevations at the location of their perpendicular connection.

Figure 7:
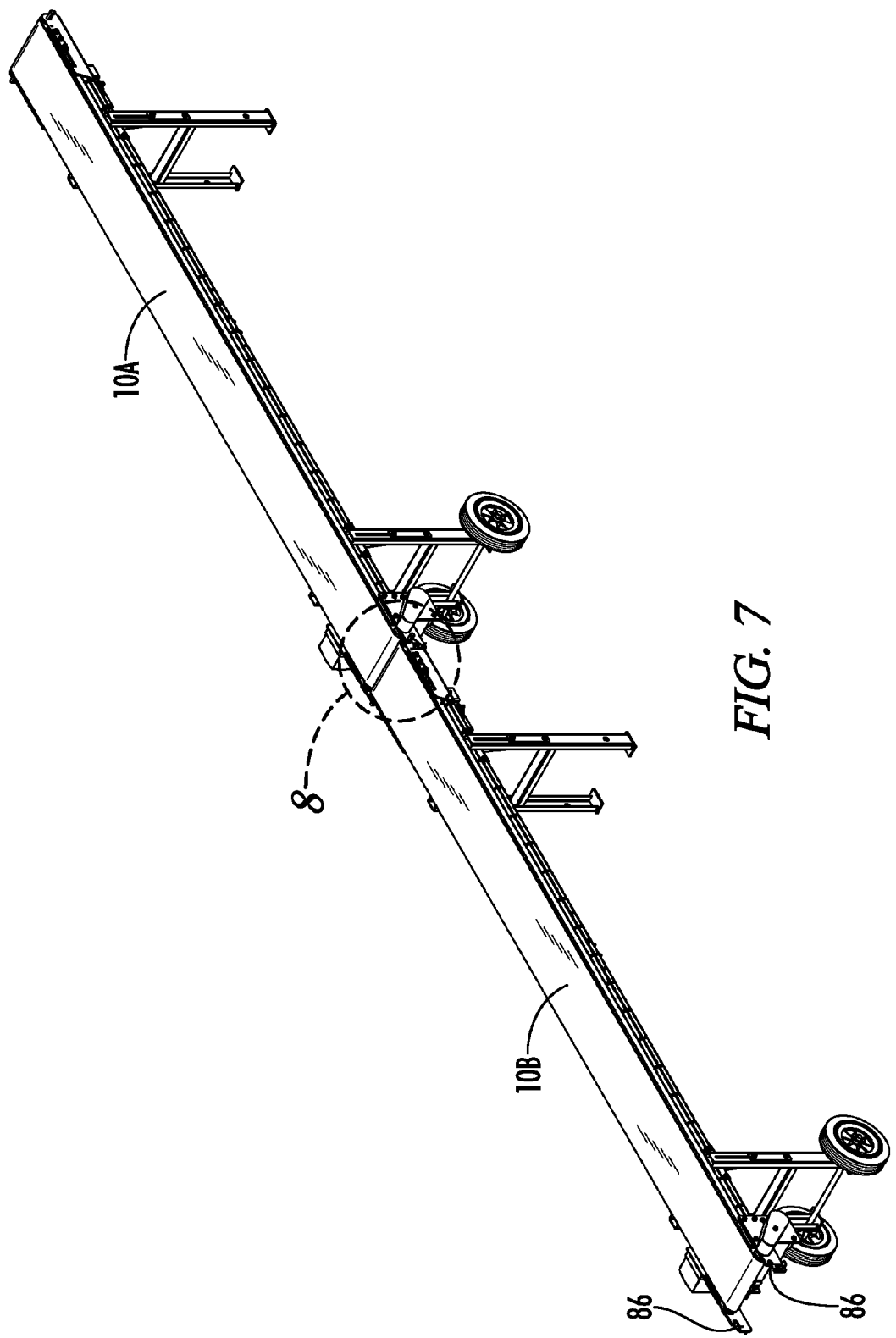
FIG. 7 is a perspective view showing end to end connection of two conveyor segments.
Figure 8:
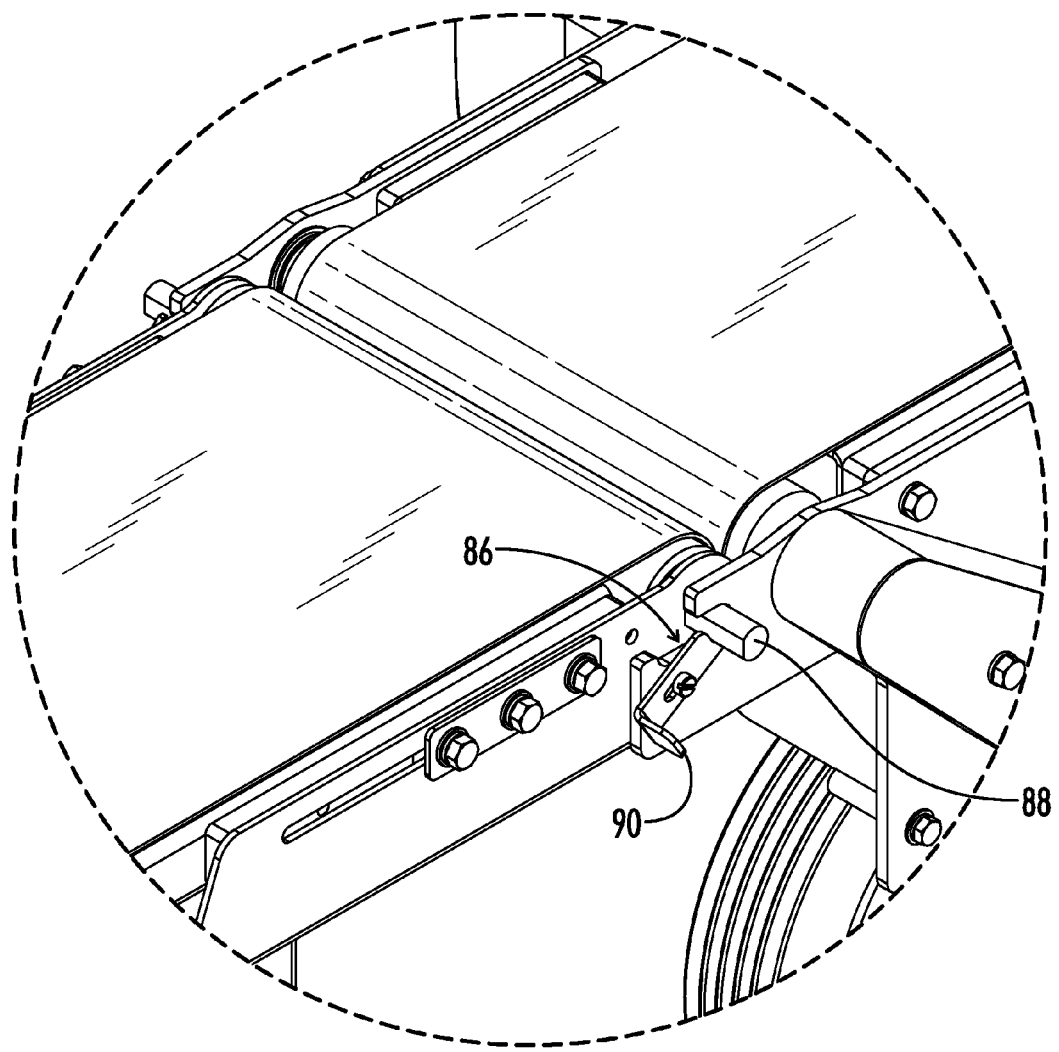
FIG. 8 is an enlarged perspective view of the area circled as detail 8 in FIG. 7, showing the end to end connection.

Additionally, as seen in FIG. 7, each of the conveyor segments such as 10A and 10B include first and second complementary end connector structures 86 and 88, respectively, defined on the first and second ends 14 and 16, respectively, of their conveyor bed assemblies. This allows the conveyors 10A and 10B, which may also be referred to as conveyor segments 10A and 10B, to be connected end to end as seen in FIG. 7.

The first end connector structure 86 may include a pair of laterally spaced slots 86, and the second end connector structure 88 may include a pair of laterally extending laterally spaced pins 88 which are constructed to be received in the slots 86. A locking mechanism 90 may be provided to lock the pins 88 in the slots 86.

Thus as shown in FIGS. 3 and 7, each of the conveyor segments such as 10A and 10B can be described as a modular conveyor apparatus, and two substantially identical conveyor segments can either be connected together perpendicularly as shown in FIG. 3 or end to end as shown in FIG. 7. Furthermore, a multitude of such substantially identical modular conveyor segments can be put together to form any desired arrangement of conveyor pathways extending both longitudinally and transversely. Each of the conveyor segments may be individually powered by its own drive motor 20.

Although the apparatus 10 has been described with the hooks 38 and 40 defined on its take-up end, it will be understood that the hooks could alternatively or additionally be defined on the drive end.

In the one example shown, the individual conveyor segment may be a nominal ten foot length segment having a nominal conveyor belt width of ten inches. The hook spacing 42 may be twelve inches and the slot spacing 74 may be six inches. This results in approximately nineteen equally spaced slots 72 along the length of the side walls of the conveyor bed assembly. This may be generally described as having at least ten openings equally spaced along the length of the longitudinal side wall.

While certain preferred embodiments of the invention have been illustrated and described for purposes of the present disclosure, numerous changes in the arrangement and construction of parts may be made by those skilled in the art which changes are encompassed within the scope and spirit of the present invention as defined by the appended claims.

What is claimed is:

1. A modular conveyor apparatus, comprising:
a conveyor bed assembly including first and second ends and first and second longitudinal sides;
a drive roller attached to the first end of the conveyor bed assembly;
an idler roller attached to the second end of the conveyor bed assembly;
an endless conveyor belt extending around the conveyor bed assembly and the drive roller and the idler roller;
at least one of the first and second ends of the conveyor bed assembly including a pair of laterally spaced hooks spaced apart by a hook spacing distance;
at least one of the first and second longitudinal sides including a plurality of slots defined therein, the slots being complementary to the hooks for receiving the hooks of another like conveyor in the slots, so that the conveyor can be connected perpendicularly to the other like conveyor at a selected one of a plurality of locations along a length of the conveyor.

2. The apparatus of claim 1, wherein:
the slots are equally spaced along the length of the conveyor by a slot spacing, and the hook spacing is a whole multiple of the slot spacing, so that the plurality of selectable locations along the length of the conveyor are separated by no more than the hook spacing.

3. The apparatus of claim 2, wherein:
the hook spacing is equal to the slot spacing.

4. The apparatus of claim 2, wherein:
the hook spacing is twice the slot spacing.

5. The apparatus of claim 1, wherein:
the conveyor bed assembly includes a take-up assembly at the second end, the idler roller being mounted on the take-up assembly, and the hooks are defined on the take-up assembly.

6. The apparatus of claim 5, further comprising:
a take-up end leg assembly connected to the conveyor bed assembly for supporting the second end of the conveyor bed assembly from a ground surface; and
a drive end leg assembly connected to the conveyor bed assembly for supporting the first end of the conveyor bed assembly from the ground surface, the drive end leg assembly including wheels for engaging the ground surface.

7. The apparatus of claim 1, wherein:
the at least one of the first and second longitudinal sides includes an upper vertical wall and a lower laterally outwardly protruding laterally inwardly open channel defined by a tapered intermediate wall, a lower vertical wall, and a bottom laterally inwardly extending flange, and each of the slots is a vertically extending slot defined in both the tapered intermediate wall and the lower vertical wall.

8. The apparatus of claim 7, wherein:
the hooks are configured to rest on lower edges of two of the slots of another like conveyor when the conveyor is connected perpendicularly to the other like conveyor, the lower edges being defined in the lower vertical wall of the other like conveyor.

9. The apparatus of claim 1, further comprising:
first and second complementary end connector structures defined on the first and second ends, respectively, of the conveyor bed assembly so that the conveyor can be connected end to end to another like conveyor.

10. A modular conveyor apparatus, comprising:
a conveyor bed assembly, including a pair of laterally spaced protrusions at one end of the conveyor bed assembly, the conveyor bed assembly including a longitudinal side having a plurality of equally spaced openings defined therein, the openings being complementary to the protrusions so that the protrusions can be received in the openings of another like conveyor apparatus, the protrusions being spaced apart by a protrusion spacing, and the openings being spaced apart by an opening spacing, the protrusion spacing being a whole multiple of the opening spacing.

11. The apparatus of claim 10, wherein the protrusion spacing is twice the opening spacing.

12. The apparatus of claim 10, further comprising:
an idler roller operably associated with the one end of the conveyor bed assembly; and
a drive roller operably associated with another end of the conveyor bed assembly.

13. The apparatus of claim 12, further comprising:
a wheeled drive-end leg supporting the conveyor bed assembly nearer to the drive roller than to the idler roller; and a non-wheeled idler-end leg supporting the conveyor bed assembly nearer to the idler roller than to the drive roller.

14. The apparatus of claim 10, wherein:
the longitudinal side of the conveyor bed assembly has a cross-sectional shape including a laterally outwardly protruding laterally inwardly open channel, and the openings are defined in a wall of the channel, so that the protrusions of another like conveyor apparatus can be received through the openings into the channel.

15. The apparatus of claim 10, wherein:
the conveyor bed assembly includes a take-up assembly defining the one end of the conveyor belt assembly, the take-up assembly including two spaced vertically oriented take-up plates, and the protrusions are defined on the take-up plates.

16. The apparatus of claim 10, further comprising:
first and second complementary end connectors defined on the one end and another end, respectively, of the conveyor bed assembly, so that two like conveyor apparatus may be connected end to end.

17. A modular conveyor apparatus, comprising:
first and second conveyor segments, each conveyor segment being of substantially identical construction and including:
a conveyor bed having first and second ends, and having a longitudinal sidewall;
a drive roller connected to the first end;
an idler roller connected to the second end;
a drive motor for driving the drive roller;
a conveyor belt extending around the drive roller and the idler roller;
a pair of laterally spaced protrusions extending from the second end; and
the longitudinal side wall having a plurality of openings defined therein complementary in shape to the protrusions; and
the first and second conveyor segments being connected together perpendicularly with the laterally spaced protrusions of the first conveyor segment received in two of the openings in the longitudinal side wall of the second conveyor segment.

18. The apparatus of claim 17, wherein:
the plurality of openings include at least ten openings equally spaced along a length of the longitudinal side wall.

19. The apparatus of claim 18, wherein:
the laterally spaced protrusions are spaced apart by a protrusion spacing, and the protrusion spacing is a whole multiple of the spacing between the openings.

20. The apparatus of claim 17, wherein:
each conveyor segment further includes a second longitudinal wall, laterally spaced from the first mentioned longitudinal wall, the second longitudinal wall including a second plurality of openings defined therein complementary in shape to the protrusions.

* * * * *